US012055069B2

(12) United States Patent
Heinig et al.

(10) Patent No.: US 12,055,069 B2
(45) Date of Patent: Aug. 6, 2024

(54) SYSTEM AND METHOD FOR REDUCING BLADE HOOK STRESS IN A TURBINE BLADE

(71) Applicant: SIEMENS ENERGY, INC., Orlando, FL (US)

(72) Inventors: Roger W. Heinig, Cocoa Beach, FL (US); Jeremy P. Jasikiewicz, Orlando, FL (US); Jeremy T. Marshall, Clover, SC (US); Paul Vezzetti, Rock Hill, NC (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 18/237,220

(22) Filed: Aug. 23, 2023

(65) Prior Publication Data

US 2024/0093615 A1 Mar. 21, 2024

Related U.S. Application Data

(60) Provisional application No. 63/376,328, filed on Sep. 20, 2022.

(51) Int. Cl.
*F01D 5/30* (2006.01)

(52) U.S. Cl.
CPC ........ *F01D 5/3038* (2013.01); *F05D 2230/60* (2013.01)

(58) Field of Classification Search
CPC ........ F01D 5/3038; F01D 5/30; F01D 5/3007; F05D 2230/60
See application file for complete search history.

(56) References Cited

U.S. PATENT DOCUMENTS

| | | | | |
|---|---|---|---|---|
| 3,014,695 A * | 12/1961 | Rankin | F01D 5/3007 | 416/212 R |
| 5,554,005 A * | 9/1996 | Nguyen | F01D 5/3007 | 416/248 |
| 6,183,202 B1 * | 2/2001 | Ganshaw | F01D 5/3007 | 416/248 |
| 7,513,747 B2 * | 4/2009 | Bachofner | F01D 5/3038 | 416/248 |
| 2003/0129060 A1 * | 7/2003 | Knott | F04D 29/322 | 416/219 R |
| 2011/0110785 A1 * | 5/2011 | Kreiselmaier | F01D 5/3038 | 416/219 R |

* cited by examiner

*Primary Examiner* — David E Sosnowski
*Assistant Examiner* — Theodore C Ribadeneyra

(57) ABSTRACT

A turbine assembly includes a rotating blade including a T-root. The T-root defines a first engagement surface that is cylindrical, a rotor including a blade groove arranged to receive the rotating blade, the blade groove including a neck portion that defines a second engagement surface and a neck surface that is normal to and intersects the second engagement surface. The second engagement surface is cylindrical, and a relief groove is formed in the neck surface and positioned adjacent the second engagement surface.

18 Claims, 4 Drawing Sheets

SYSTEM AND METHOD FOR REDUCING BLADE HOOK STRESS IN A TURBINE BLADE

BACKGROUND

Steam turbines, and in particular axial flow steam turbines include a rotating element and a stationary element. Typically, the rotating element includes a rotor that supports several rows of rotating blades. The stationary element includes casings or housings that support rows of stationary blades that correspond to the rows of rotating blades. The rotating blades are installed in one or more blade grooves per row of blades and are subjected to centrifugal loads, steam bending loads, thermo-mechanical loads, and vibratory loads during operation.

SUMMARY

In one aspect, a turbine assembly includes a rotating blade including a T-root. The T-root defines a first engagement surface that is cylindrical, a rotor including a blade groove arranged to receive the rotating blade, the blade groove including a neck portion that defines a second engagement surface and a neck surface that is normal to and intersects the second engagement surface. The second engagement surface is cylindrical, and a relief groove is formed in the neck surface and positioned adjacent the second engagement surface.

In one aspect, a turbine assembly includes a rotor defining a rotational axis and a radial plane that is normal to a rotational axis of the rotor, a groove hook face having a first portion and a second portion that is symmetrical to the first portion with respect to the radial plane. The first portion and the second portion are cylindrical and define a rotor hook diameter. A first neck surface is arranged normal to the first portion and extends radially outward from the first portion, a second neck surface is arranged normal to the second portion and extends radially outward from the second portion, the second neck surface being symmetrical to the first neck surface with respect to the radial plane. A first relief groove is formed in the first neck surface and is positioned adjacent the first portion, and a second relief groove is formed in the second neck surface and is positioned adjacent the second portion, the second relief groove being symmetrical to the first relief groove with respect to the radial plane.

In one aspect, a method of relieving stress in a T-root of a rotating turbine blade includes forming a first relief groove in a first neck surface of a blade groove formed in a rotor, the first relief groove including a semi-circular portion and extending circumferentially around a rotational axis of the rotor. The method also includes forming a second relief groove in a second neck surface of the blade groove, the second relief groove including a semi-circular portion and extending circumferentially around the rotational axis of the rotor such that the second relief groove is symmetrical with the first relief groove with respect to a plane that includes the rotational axis and bisects the blade groove.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
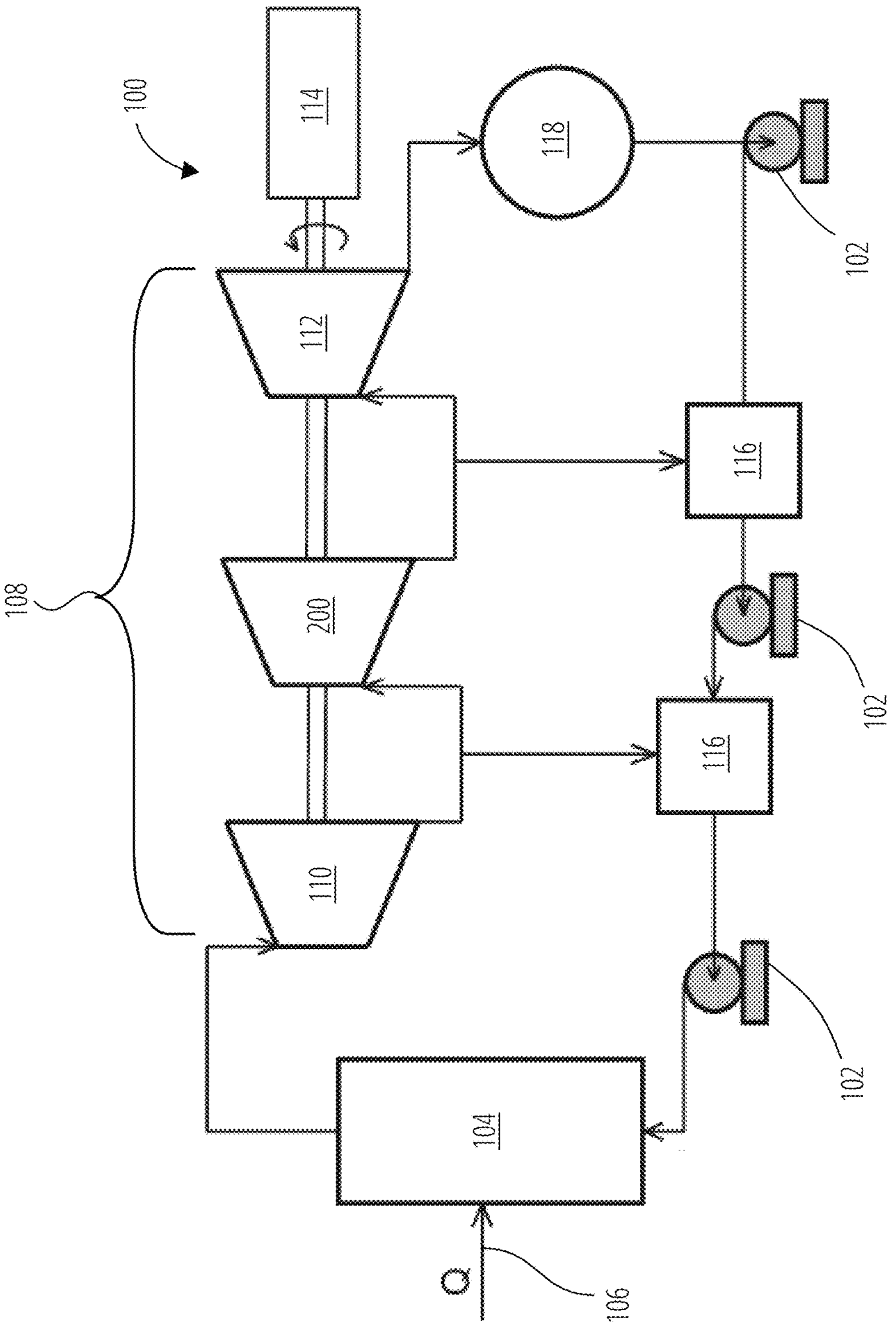
FIG. 1 is a schematic illustration of a power generation system that includes a steam turbine.

Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

It should be understood that the words or phrases used herein should be construed broadly, unless expressly limited in some examples. For example, the terms “including,” “having,” and “comprising,” as well as derivatives thereof, mean inclusion without limitation. The singular forms “a”, “an” and “the” are intended to include the plural forms as well, unless the context clearly indicates otherwise. Further, the term “and/or” as used herein refers to and encompasses any and all possible combinations of one or more of the associated listed items. The term “or” is inclusive, meaning and/or, unless the context clearly indicates otherwise. The phrases “associated with” and “associated therewith,” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Also, although the terms “first”, “second”, “third” and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term “adjacent to” may mean that an element is relatively near to but not in contact with a further element or that the element is in contact with the further portion, unless the context clearly indicates otherwise. Further, the phrase “based on” is intended to mean “based, at least in part, on” unless explicitly stated otherwise. Terms “about” or “substantially” or like terms are intended to cover variations in a value that are within normal industry manufacturing tolerances for that dimension. If no industry standard is available, a variation of twenty percent would fall within the meaning of these terms unless otherwise stated.

FIG. 1 schematically illustrates a power generation system 100 operating on the Rankin cycle with water/steam as the working fluid. In the illustrated system, one or more feed pumps 102 pump water into a heating system such as a boiler 104 where heat energy from a heat source 106 is used to convert the liquid water to high-pressure (e.g., between 500 and 5000 psi), high-temperature (e.g., between 500 and 1500 degrees F.) steam. While the illustrated construction includes a boiler 104 that provides the heat needed to convert the water to steam, many other heat sources (e.g., concentrated solar, nuclear, geothermal, stored heat energy, heat recovery steam generators, etc.) are possible and could be used in place of or in conjunction with a boiler 104.

The high-pressure high-temperature steam is then directed to a turbine 108 that expands the steam to convert the energy to rotational energy. In the illustrated construction, the turbine 108 includes an HP turbine section 110 (high pressure), an IP turbine section 200 (intermediate pressure), and an LP turbine section 112 (low pressure) that are connected to a common shaft to drive a generator 114. Within or between these various turbine sections 110, 200, and 112, some of the steam may be extracted and directed to one or more feedwater heaters 116 that operate to preheat the water before it enters the boiler 104. In addition, while not shown, steam exiting the HP turbine section 110 may be re-directed to the boiler and reheated prior to being delivered to the IP turbine section 200. A similar process could be followed with the steam exiting the IP turbine section 200 before it enters the LP turbine section 112 if desired. After the steam exits the LP turbine section, it enters a condenser 118 where the steam is cooled and condensed to liquid water which is then pumped by the feed pumps 102 to complete the cycle.

As one of ordinary skill in the art will realize, many other arrangements of a steam turbine are possible. The actual arrangement of the components of the cycle is not important to the arrangement described with regard to FIG. 2 through FIG. 4.

Figure 2:
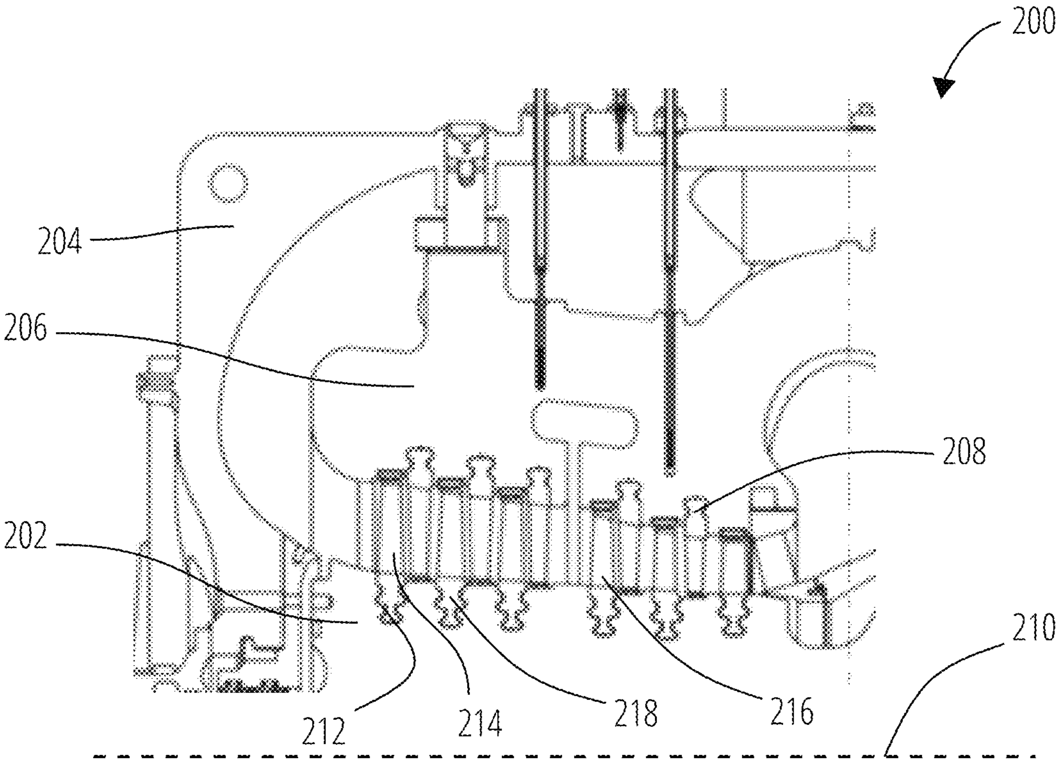
FIG. 2 is a cross-sectional view of a portion of the steam turbine of FIG. 1.

FIG. 2 illustrates a portion of the IP turbine section 200 and better illustrates some of the components that make up the IP turbine section 200. As illustrated, the IP turbine section 200 includes a rotor 202, an outer casing 204, and an inner casing 206. The outer casing encloses the components of the IP turbine section 200 and remains stationary during operation. The inner casing 206 is supported within the outer casing 204 and supports a series of stationary blade rows 208. Stationary blades are positioned within each of the stationary blade rows 208 to define a portion of a steam path through the IP turbine section 200. It should be noted that many different arrangements are possible for the stationary components of the IP turbine section 200 with FIG. 2 illustrating one possible non-limiting arrangement.

The rotor 202 is supported for rotation about a rotational axis 210 and includes a series of blade grooves 212 that are arranged to receive rotating blade rows 214 made up of rotating blades 216. The rotating blades 216 each include a blade root 218 that is arranged to engage the blade groove 212. The blade grooves 212 correspond with the stationary blade rows 208 to complete the steam path through the IP turbine section 200.

Figure 3:
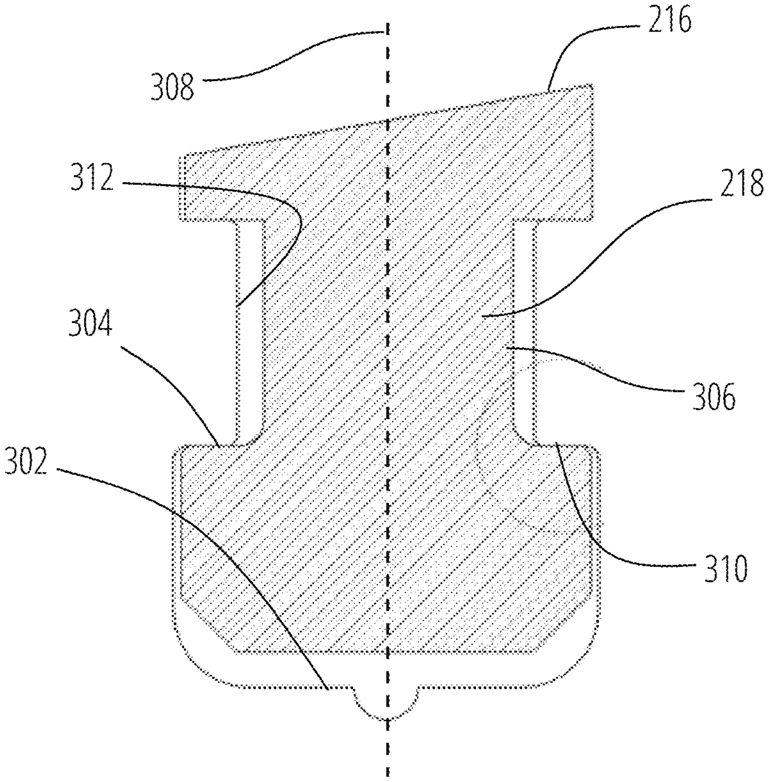
FIG. 3 is a partial section view of a portion of a rotating blade installed in a prior art blade groove of a rotor of FIG. 2.

FIG. 3 illustrates a prior art arrangement of a blade groove 302 with a rotating blade 216 including a blade root 218 installed therein. In the illustrated construction, the blade root 218 is a T-root design that includes a blade engagement face 304 radially inward of a neck region 306. The blade engagement face 304 is cylindrical such that when all the rotating blades 216 that make up a rotating blade row 214 are installed, the blade engagement faces 304 cooperate with one another to define a continuous or substantially continuous cylindrical surface that extends around all or virtually all of the rotational axis 210 of the rotor 202. The neck region 306 extends normal to the blade engagement face 304 and provides clearance between the rotating blade 216 and the blade groove 302.

The blade root 218 is bisected by a radial plane 308 that is normal to the rotational axis 210 such that the features on the left side of the blade root 218 are mirrored or symmetric with the same features on the right side of the blade root 218.

The blade groove 302 includes a groove hook face 310 that is substantially cylindrical and extends continuously around all or virtually all of the rotational axis 210 of the rotor 202. A diameter of the groove hook face 310 is equal to a diameter defined by the blade engagement faces 304 such that a close engagement is achieved when the rotating blades 216 are installed in the blade groove 302.

A neck surface 312 intersects with groove hook face 310 and extends radially outward in a direction normal to the groove hook face 310. A small chamfer or fillet may be provided at the intersection as may be desired.

Like the blade root 218, the blade groove 212 is bisected by the radial plane 308 such that the features on the left side of the blade groove 212 are mirrored or symmetric with the same features on the right side of the blade groove 212.

Figure 4:
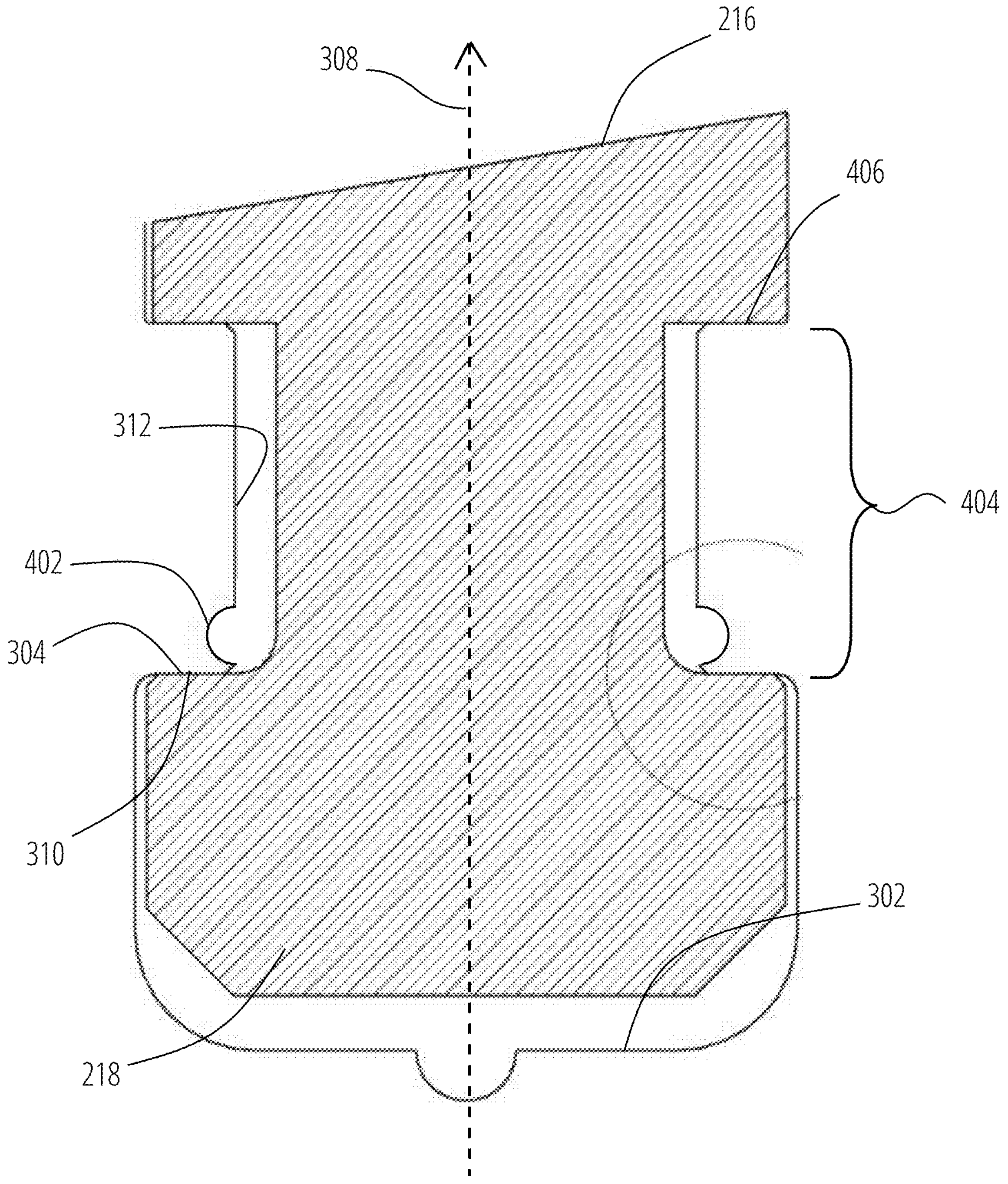
FIG. 4 is a partial section view of a portion of a rotating blade installed in a blade groove of a rotor of FIG. 2.

FIG. 4 illustrates the same general arrangement as illustrated in FIG. 3 but with the addition of features selected to reduce the stress levels applied to the blade engagement face 304 of the rotating blades 216.

The blade root 218 of FIG. 4 is the same as the blade root 218 of FIG. 3. The blade groove 302 includes the same blade engagement face 304 as illustrated in FIG. 3 and a similarly arranged neck surface 312. However, a relief groove 402 is formed in the neck surface 312 adjacent the groove hook face 310 on both sides of the radial plane 308. In the illustrated construction, the relief grooves 402 are symmetrical about the radial plane 308 with other arrangements being possible.

The neck surface 312 defines a radial length 404 that extends from the groove hook face 310 to a radial outer surface 406 such that a zero position is defined at the groove hook face 310 and 100 percent is defined at the radial outer surface 406.

Each relief groove 402 includes a semi-circular cross-section and extends around the most or all of the rotational axis 210. In one arrangement, each relief groove 402 is oval and includes a semi-circular portion and two straight side portions spaced apart a distance equal to the diameter of the semi-circular portion (better illustrated in FIG. 5). However, other arrangements include a semi-circular groove cross-section.

As noted, each relief groove 402 is positioned adjacent the groove hook face 310 and more specifically is located between zero percent and twenty-five percent and more specifically between two percent and twenty percent. Each relief groove 402 is formed such that the relief groove 402 is entirely radially outward (as indicated by the arrow on the radial plane 308) of the groove hook face 310. An ideal or desired position of the relief groove 402 positions the relief groove 402 a first distance from the groove hook face 310. For example, the ideal position may be five percent of the length of the neck surface 312. In some constructions, the relief groove 402 is intentionally positioned radially outward of the ideal position. For example, if the ideal position places one end of the relief groove 402 at five percent of the length of the neck surface 312, this construction may place the first edge of the relief groove 402 at ten percent of the length of the neck surface 312. This arrangement allows future machining of the groove hook face 310 without diminishing the effectiveness of the relief grooves 402.

In order to reduce the stress applied to the blade engagement faces 304 of the rotating blades 216, the relief grooves 402 can be added to a rotor 202.

Figure 5:
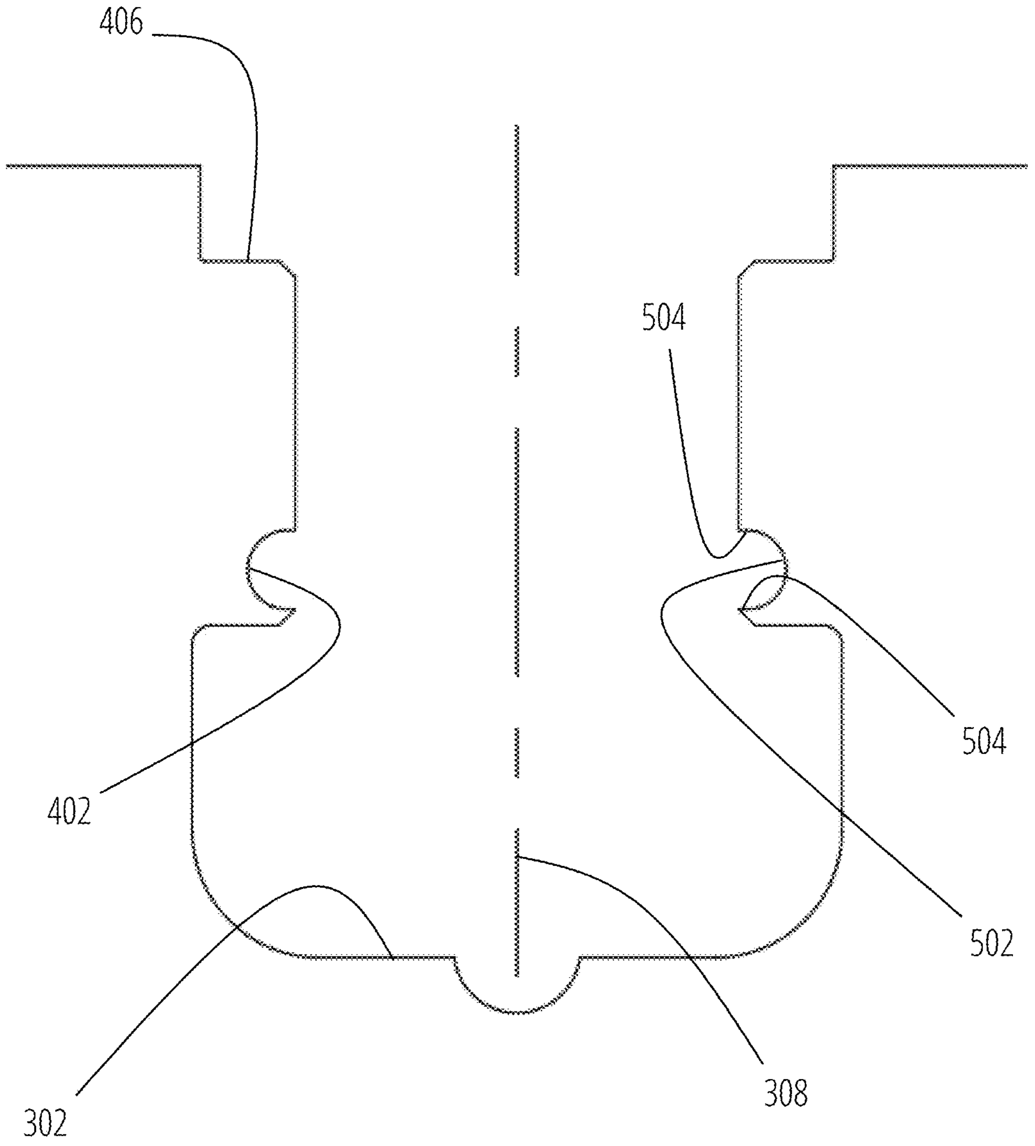
FIG. 5 is a cross-sectional view of the blade groove of FIG. 4 with the blade removed.

FIG. 5 illustrates features and steps that may be included in the process of adding the relief grooves 402. If the rotor 202 is new the relief grooves 402 can be formed directly into the blade groove 302. While a semi-circular cross section can be employed, the relief grooves 402 of FIG. 5 include a semi-circular portion 502 and two straight portions 504. The straight portions 504 allow for accurate measurement and placement of the relief grooves 402 with respect to the groove hook face 310 and/or the radial outer surface 406.

For some rotors 202, particularly those that have operated for some time, it is sometimes necessary to machine the radial outer surface 406 to assure that it is round. The radial outer surface 406 can then be used as a reference surface for the proper placement of the relief grooves 402.

It should be noted that the foregoing description uses a single hook T-root blade as an example with the relief grooves 402 applied to the rotor 202. However, the relief grooves 402 can be applied to T-root designs with multiple pairs of engagement surfaces (i.e., multiple hooks) at different radial locations. In addition, it can be applied to inverted T-root designs with a single pair of engagement surfaces or multiple pairs of engagement surfaces at different radial locations. Thus, the invention should not be limited to only those examples illustrated or discussed herein.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope. Rather, the scope of patented subject matter is defined only by the allowed claims. Moreover, none of these claims are intended to invoke a means plus function claim construction unless the exact words "means for" are followed by a participle.

What is claimed is:

1. A turbine assembly comprising:

a rotating blade including a T-root, the T-root defining a first engagement surface, the first engagement surface defining a portion of a cylindrical surface;

a rotor including a blade groove arranged to receive the rotating blade, the blade groove including a neck portion that defines a second engagement surface and a neck surface that is normal to and intersects the second engagement surface, the second engagement surface being cylindrical; and a relief groove formed in the neck surface and positioned adjacent the second engagement surface, wherein the relief groove is positioned completely radially outward of the first engagement surface.

2. The turbine assembly of claim 1, wherein the first engagement surface defines a first diameter, and the second engagement surface defines a second diameter that is equal to the first diameter.

3. The turbine assembly of claim 1, wherein the relief groove includes a semi-circular portion.

4. The turbine assembly of claim 1, wherein a radial plane includes a rotational axis of the rotor and bisects the T-root and the blade groove, the rotating blade further comprising a third engagement surface that is symmetrical with the first engagement surface with respect to the radial plane.

5. The turbine assembly of claim 4, wherein the rotor further comprises a fourth engagement surface and a second relief groove, and wherein the fourth engagement surface and the second relief groove are symmetric with the second engagement surface and the relief groove with respect to the radial plane.

6. A turbine assembly comprising:

a rotating blade including a T-root, the T-root defining a first engagement surface, the first engagement surface defining a portion of a cylindrical surface;

a rotor including a blade groove arranged to receive the rotating blade, the blade groove including a neck portion that defines a second engagement surface and a neck surface that is normal to and intersects the second engagement surface, the second engagement surface being cylindrical; and a relief groove formed in the neck surface and positioned adjacent the second engagement surface, wherein the neck surface defines a radial length from the second engagement surface to a radial outer surface, and wherein the relief groove is fully positioned between zero percent and twenty-five percent of the length with zero percent being at the intersection of the neck surface and the second engagement surface.

7. The turbine assembly of claim 6, wherein the relief groove is fully positioned between two percent and twenty percent of the radial length.

8. The turbine assembly of claim 6, wherein the relief groove is positioned radially outward of an ideal position of the relief groove.

9. A turbine assembly comprising:

a rotor defining a rotational axis and a radial plane that is normal to a rotational axis of the rotor;

a groove hook face having a first portion and a second portion that is symmetrical to the first portion with respect to the radial plane, the first portion and the second portion being cylindrical and defining a rotor hook diameter;

a first neck surface arranged normal to the first portion and extending radially outward from the first portion;

a second neck surface arranged normal to the second portion and extending radially outward from the second portion, the second neck surface being symmetrical to the first neck surface with respect to the radial plane;

a first relief groove formed in the first neck surface and positioned adjacent the first portion; and a second relief groove formed in the second neck surface and positioned adjacent the second portion, the second relief groove being symmetrical to the first relief groove with respect to the radial plane.

10. The turbine assembly of claim 9, wherein the first relief groove and the second relief groove each include a semi-circular portion.

11. The turbine assembly of claim 9, wherein the first relief groove is positioned completely radially outward of the first portion and the second relief groove is positioned completely radially outward of the second portion.

12. The turbine assembly of claim 9, wherein the first neck surface defines a radial length from the first portion to a radial outer surface, and wherein the first relief groove is fully positioned between zero percent and twenty-five percent of the length with zero percent being at an intersection of the first neck surface and the first portion.

13. The turbine assembly of claim 12, wherein the first relief groove is fully positioned between two percent and twenty percent of the radial length.

14. The turbine assembly of claim 12, wherein the second neck surface defines a radial length from the second portion to a radial outer surface, and wherein the second relief groove is fully positioned between zero percent and twenty-five percent of the length with zero percent being at an intersection of the second neck surface and the second portion.

15. The turbine assembly of claim 14, wherein the second relief groove is fully positioned between two percent and twenty percent of the radial length.

16. A method of relieving stress in a T-root of a rotating turbine blade, the method comprising:

forming a first relief groove in a first neck surface of a blade groove formed in a rotor, the first relief groove including a semi-circular portion and extending circumferentially around a rotational axis of the rotor; and forming a second relief groove in a second neck surface of the blade groove, the second relief groove including a semi-circular portion and extending circumferentially around the rotational axis of the rotor such that the second relief groove is symmetrical with the first relief groove with respect to a plane that includes the rotational axis and bisects the blade groove, selecting the position of the first relief groove and the second relief groove such that the entire first relief groove and the entire second relief groove are positioned radially outward of a groove hook face that is positioned to engage the T-root of the rotating blade, wherein the first neck surface defines a radial length from the groove hook face to a radial outer surface, and wherein the first relief groove is fully positioned between zero percent and twenty-five percent of the length with zero percent being at an intersection of the first neck surface and the groove hook face.

17. The turbine assembly of claim 16, wherein the first relief groove is fully positioned between two percent and twenty percent of the radial length.

18. The method of claim 16, further comprising machining the radial outer surface to provide a round reference surface and positioning the first relief groove and the second relief groove using the machined radial outer surface as a reference.

* * * * *